United States Patent
Leibowitz

(10) Patent No.: US 6,829,984 B1
(45) Date of Patent: Dec. 14, 2004

(54) FLIP AND DRAIN PAN

(76) Inventor: Marc Leibowitz, 30 Parkway Dr., Syosset, NY (US) 11791

( * ) Notice: Subject to any disclaimer, the term of this patent is extended or adjusted under 35 U.S.C. 154(b) by 0 days.

(21) Appl. No.: 10/610,734

(22) Filed: Jun. 30, 2003

(51) Int. Cl.[7] .............................. A47J 37/00; A47J 43/00
(52) U.S. Cl. .............................. 99/425; 99/422; 99/339
(58) Field of Search .......................... 99/422, 348, 339, 99/340, 425, 444

(56) References Cited

U.S. PATENT DOCUMENTS

| 754,310 | A | * | 3/1904 | Horine | 222/474 |
| 1,398,655 | A | * | 11/1921 | Smith | 99/423 |
| D380,934 | S | * | 7/1997 | Alarid, Jr. | D7/354 |
| 6,237,470 | B1 | * | 5/2001 | Adams | 99/422 |
| 6,497,174 | B1 | | 12/2002 | Cacace | |

* cited by examiner

Primary Examiner—Reginald L. Alexander
(74) Attorney, Agent, or Firm—Amster, Rothstein & Ebenstein

(57) ABSTRACT

A flipping pan having a base, a rim and a handle additionally has a lip upstanding from a limited segment of the top of the rim generally opposite the handle. The lip has an arcuate cross section extending upwardly and inwardly from the segment whereby the food stuff in the pan may be flipped against the lid by appropriate movement of the handle. A flip and drain pan has drainage perforations in the lip and in a blocking member, the blocking member being movable relative to the lip between a draining position and a blocking position.

9 Claims, 5 Drawing Sheets

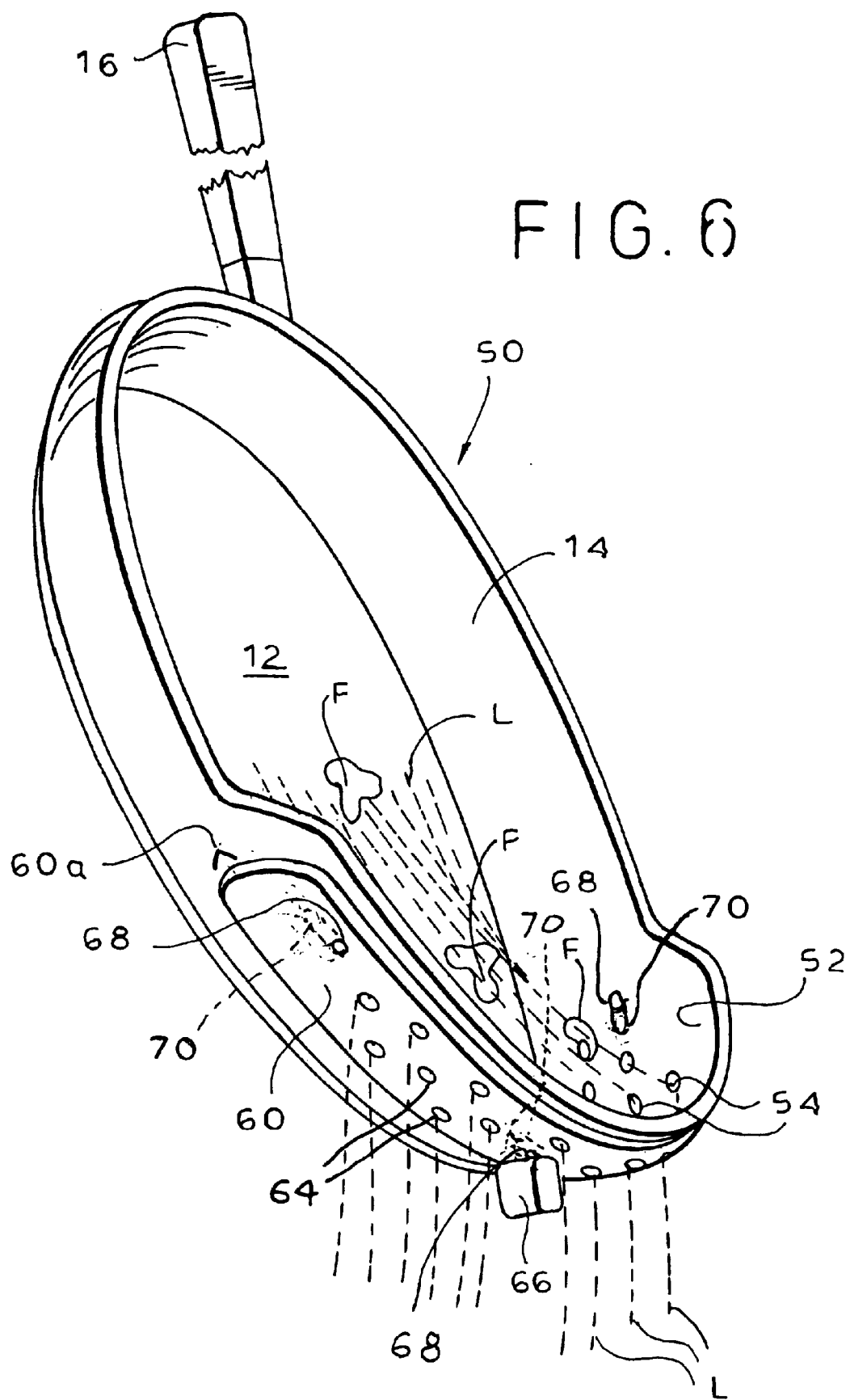

FLIP AND DRAIN PAN

BACKGROUND OF THE INVENTION

The present invention relates to a cooking pan and, in particular, a cooking pan having flip or flip and drain capabilities.

Cooking pans are well known in the culinary utensil art and are, for the most part, quite satisfactory for their intended purposes. On the other hand, the conventional cooking pan lacks special features which might increase its versatility.

Most amateur cooks resort to use of a spatula or fork in order to flip (e.g., invert) the food being cooked in a conventional frying pan and regard as well beyond their capabilities the ability of a professional chef to flip food without use of a spatula, simply by a seemingly effortless jerk of the pan in a generally horizontal or tilted plane. With this simple movement, the chef is able to invert an omelet, pancake or the like so that the bottom surface thereof now becomes the top surface thereof, thereby to enable cooking of both sides of the food. Alternatively, in the case of an omelet, which is to be served in a semicircle (rather than a full circle) presentation, more-or-less the same hand motion of the chef is able to produce the desired folding of this omelet into a half-inverted configuration. Attempts of the amateur cook to duplicate such performances typically range from less than successful to downright messy.

While the mixing of particulate or comminuted food in the pan is less difficult than fully-inverting or half-inverting food, a spatula or fork is typically used by the amateur cook because a jerk of the pan which is too weak may fail to produce any significant mixing of the food within the pan, and a jerk of the pan which is too strong may result in a messy stove top due to food escaping from the pan. Unfortunately, the use of a fork, spatula or like cooking utensil also requires a certain skill if the amateur cook is to successfully mix the particulate or comminuted food in the pan without undesirably breaking up the particulate or comminuted food and producing, at least in part, mush.

The term "flipping" as used herein includes not only the full inversion and half inversion described above (typically in a case where the food is generally unitary and initially covers the full base of the pan), but also the simple mixing described above (typically in a case where the food is particulate or comminuted such as diced food, slices, chunks, and the like).

On the other hand, when it comes to an attempt to drain liquid from the pan (whether the liquid be water, melted butter, broth or the like) while keeping the solid food within the pan, the chef typically fairs no better than the amateur cook. Not only is it difficult to ascertain the appropriate angle at which the pan must be disposed to initiate the liquid drainage, but this angle must be increased during the draining process in order to continue draining additional liquid. Accordingly, both chefs and amateur cooks tend to use an auxiliary culinary utensil, such as a perforated cover or half-cover for the pan, to assist in the draining operation by retaining the solid food particles within the pan while allowing the liquid to drain through the drainage perforations of the utensil.

Accordingly, it is an object of the present invention to provide a pan wherein in a preferred embodiment the pan configuration facilitates the flipping—whether it be full inversion, half inversion or mixing—of food without use of a spatula or fork.

Another object is to provide such a pan which in a preferred embodiment facilitates draining of liquid therefrom, while retaining solid food therein, without the use of an auxiliary culinary utensil.

A further object is to provide such a pan wherein in a preferred embodiment both flipping and draining capabilities are provided.

It is also an object of the present invention to provide such a pan wherein in a preferred embodiment the pan is simple and economical to manufacture, use and maintain.

SUMMARY OF THE INVENTION

It has now been found that the above and related objects of the present invention are obtained in a pan according to the present invention. The flipping pan comprises a substantially flat and generally circular base, a peripheral rim upstanding from the base, a handle projecting outwardly from the rim, and a lip upstanding from a limited segment of a top of the rim generally opposite the handle. The lip has an arcuate cross section extending upwardly and inwardly from the segment of the top of the rim, whereby foodstuffs within the pan may be flipped against the lip by appropriate movement of the handle.

In a preferred embodiment the lip is imperforate and has a vertical radius of curvature less than that of the rim.

The flip and drain is similar, but the lip defines drainage perforations, and the pan additionally comprises a member movable relative to the lip and defining drainage perforations. Means are provided for moving the member relative to the lip between a draining position wherein the member perforations are aligned with the lip perforations, thereby to enable the passage of liquid outwardly successively through both of the lip perforations and the member perforations, and a blocking position wherein the member perforations are non-aligned with the lip perforations, thereby to block the passage of liquid outwardly from the pan through perforations.

In a preferred embodiment, the moving means slidably moves an inner surface of the member over an outer surface of the lip, preferably horizontally. The member is releasably lockable in each of the blocking and draining positions. The drainage perforations are configured and dimensioned to substantially block passage of solid foodstuff particles therethrough.

In another preferred embodiment, an upper portion of the rim segment defines additional drainage perforations, and a lower portion of the member extends downwardly over the upper portion of the rim segment, defines additional drainage perforations, and is movable with the remainder of the member between an auxiliary draining position, wherein the upper portion additional perforations and the lower portion additional perforations are in alignment, and an auxiliary blocking position, wherein the upper portion additional perforations and the lower portion additional perforations are not in alignment.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIG. 6 is an isometric view thereof, illustrating the blocking member in a draining position.

DETAILED DESCRIPTION OF THE PREFERRED EMBODIMENTS

Figure 1:
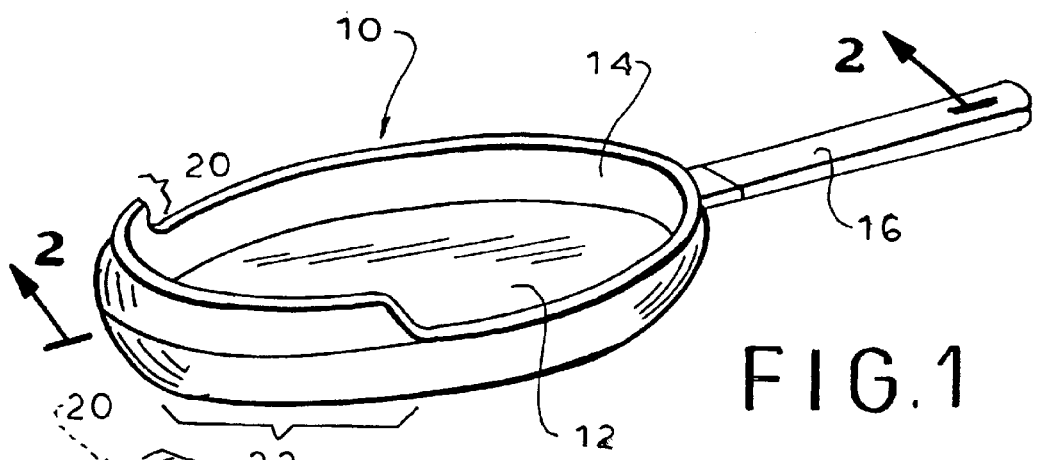
FIG. 1 is an isometric view of a flip pan according to a first embodiment of the present invention.
Figure 2:
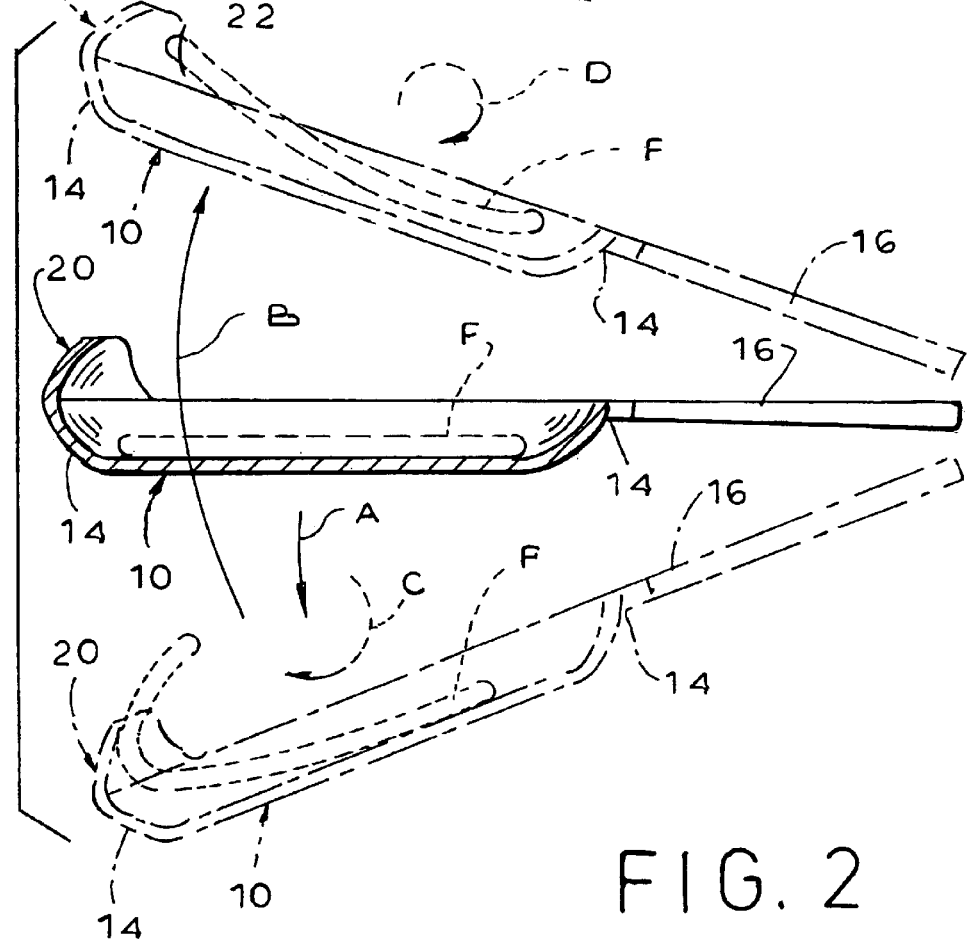
FIG. 2 is a sectional view thereof taken along the line 2—2 of FIG. 1, with the pan shown in phantom line in various stages of the flipping motion.
Figure 3:
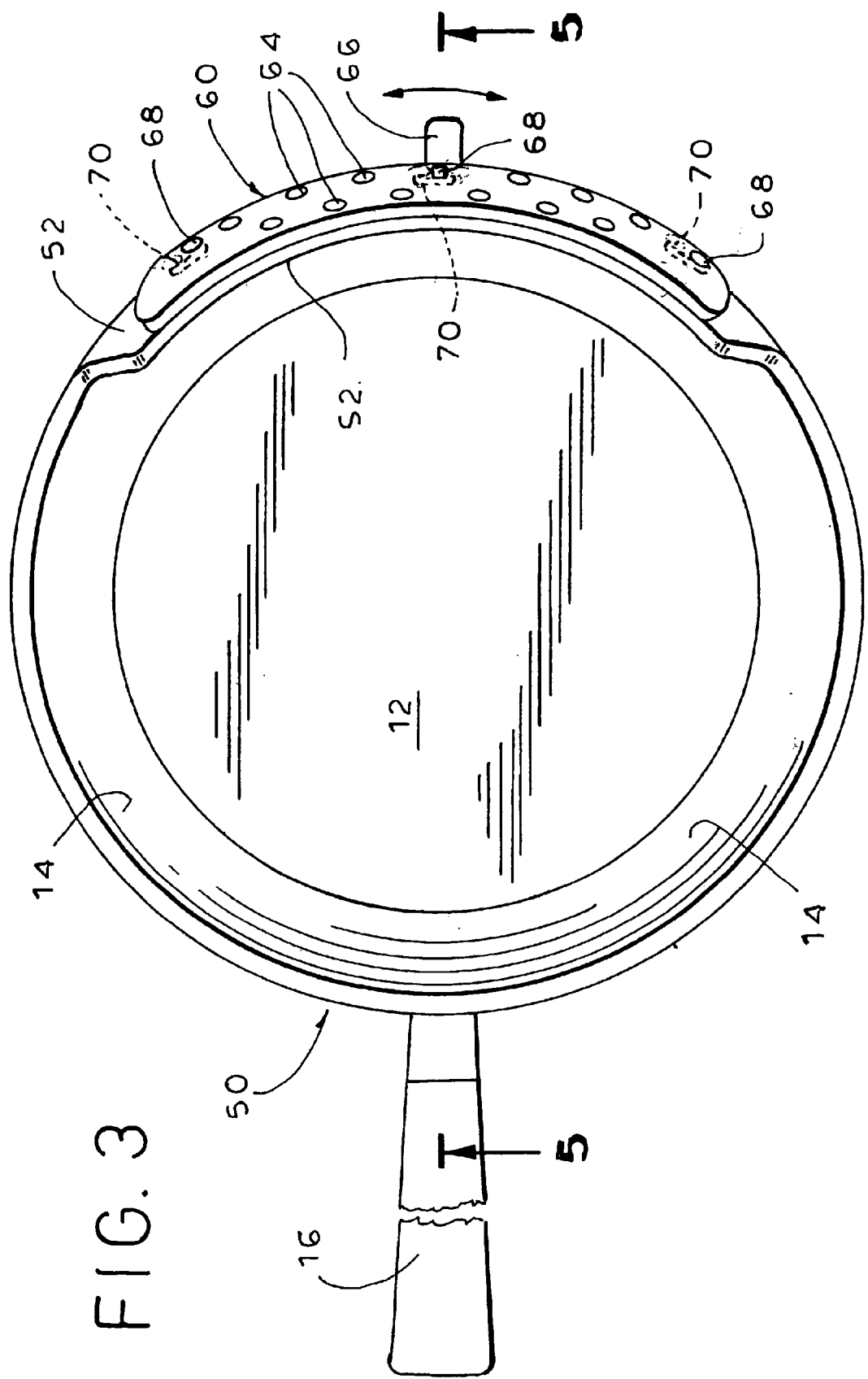
FIG. 3 is a fragmentary top plan view of a flip and drain pan according to a second embodiment of the present invention, the blocking member being illustrated in the blocking position.
Figure 4:
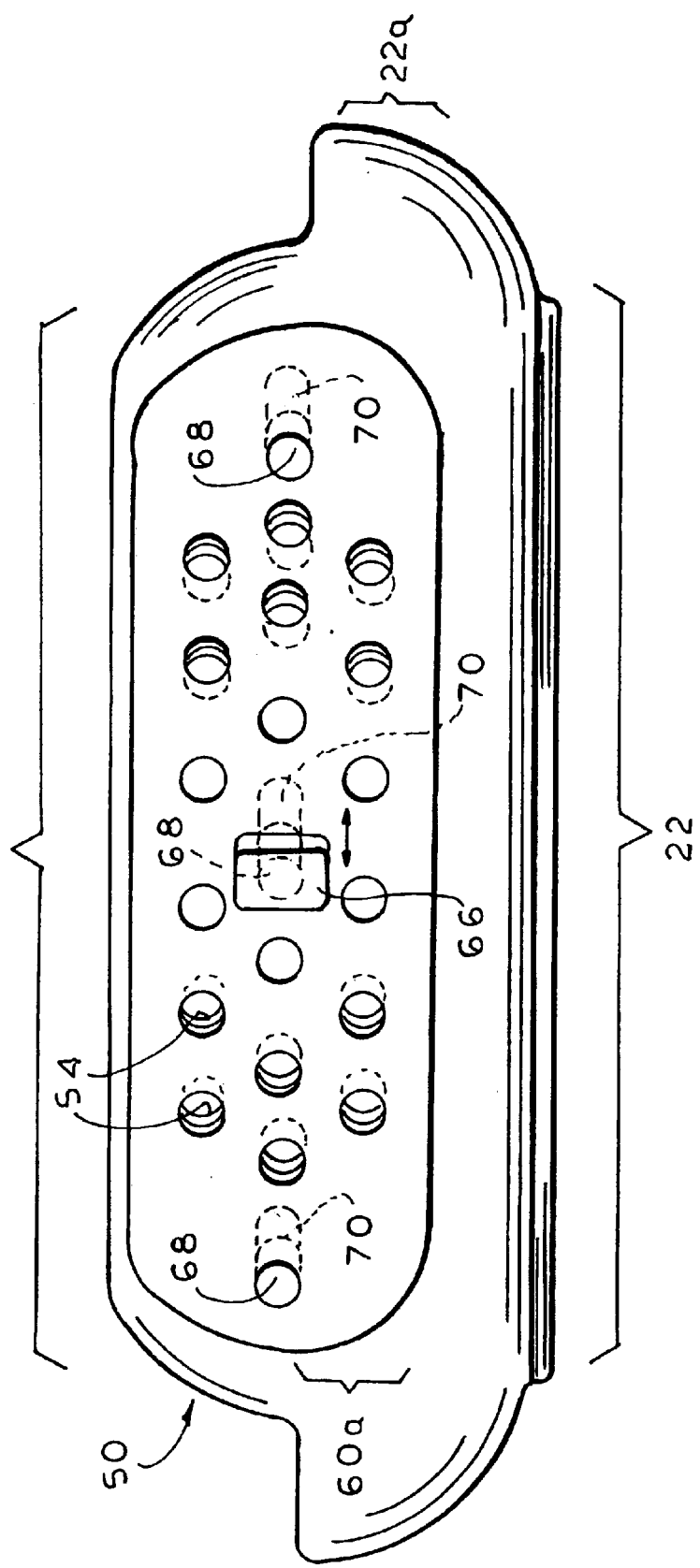
FIG. 4 is a front elevational view thereof, also illustrating the blocking member in the blocking position.
Figure 5:
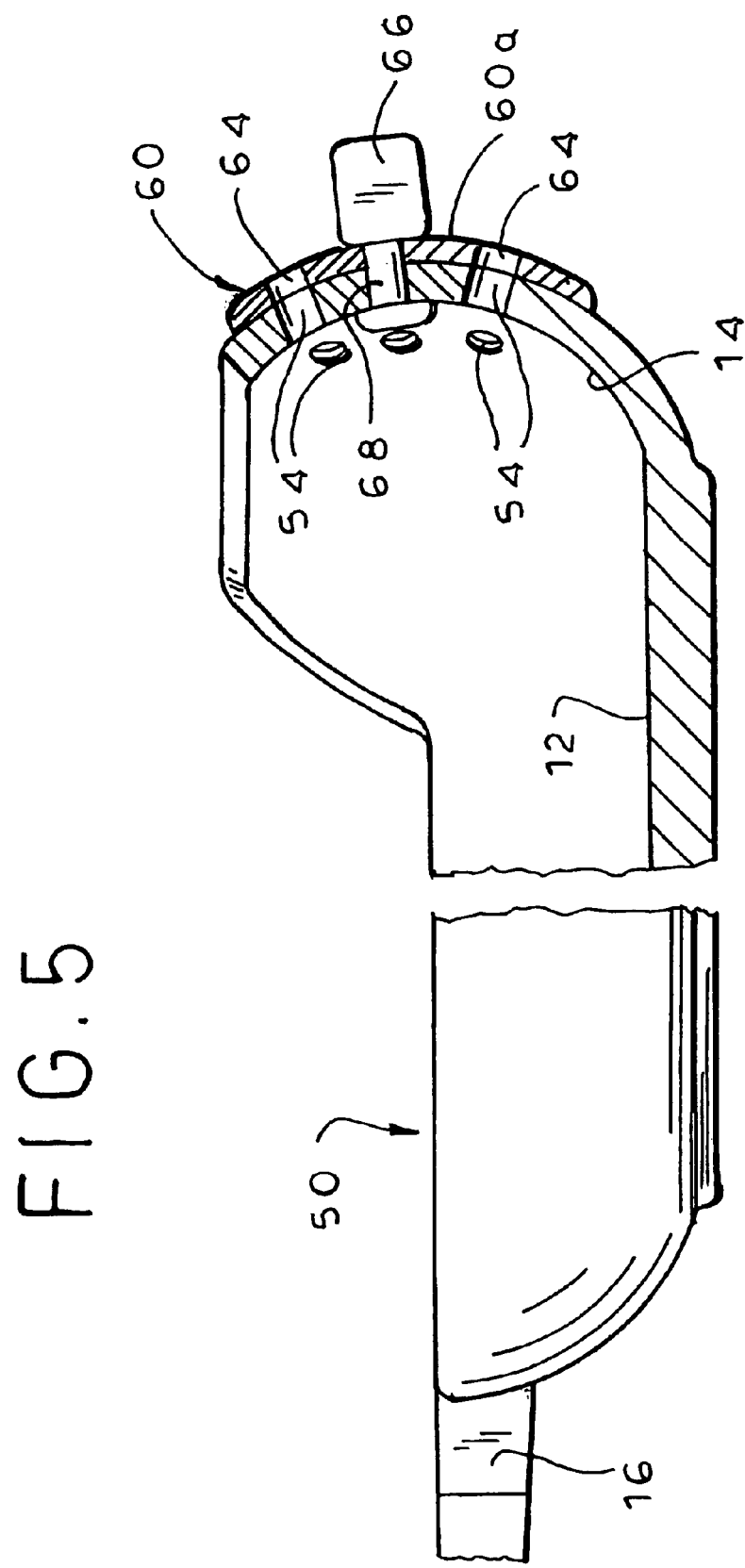
FIG. 5 is a fragmentary sectional view thereof taken along the line 5—5 of FIG. 3.

Referring now to the drawing, and in particular to FIGS. 1 and 2 thereof, therein illustrated is a flip pan according to a first embodiment of the present invention, generally designated by the reference numeral 10. In its conventional aspects, the pan 10 includes a substantially flat and generally circular base 12, a peripheral rim 14 upstanding from the base 12 and a handle 16 projecting outwardly from the rim 14. Elements 12, 14 and 16 are conventional in nature and hence need not be described herein in further detail. However, it will be noted that the base 12 may be other than totally flat and other than exactly circular, just as the rim 14 may extend either vertically (perpendicular to the base) or slightly outwardly as well (either linearly or arcuately). The base 12 and rim 14 are imperforate and cooperate to define an open-top container for holding the food F to be cooked, including any liquid L associated therewith (such as water, broth, melted butter or the like).

In its novel aspects, the pan 10 additionally comprises an imperforate lip, generally designated 20, upstanding from a limited segment 22 or arc of a top of the rim 14 generally opposite the handle 16. The lip 20 has an arcuate cross section (as best seen in FIG. 2) extending upwardly and, at least adjacent the top thereof, inwardly from the rim segment 22 towards the handle 16. The lip 20 has a vertical radius of curvature less than that of the rim 14 (the vertical radius of curvature of the rim 14 being infinite in the case of a rim 14 extending exclusively vertically upwardly from the base 12). The height of the lip 20 and its vertical radius of curvature are selected to provide the desired flip feature, as illustrated in FIG. 2, such that a sharp downward jerk (by the chef or amateur cook holding handle 16) in a direction F (see arrow A) away from the handle 16 and towards the rim segment 22 will cause the food F to continue in that direction (see dashed arrow C) under the influence of its inertia, once the movement of the pan 10 has stopped or even reversed. As the base 12 and rim segment 22 restrain the travel of the food, the inertia of the food will drive it up the rim segment 22 and the inner surface of the lip 20. The lip 22 then reverses the travel direction of the food and causes it to invert (see dashed arrow D) so that what was once the top surface of the food now rests upon the base 12. The flipping action of the lip 20 may be aided by an upward jerk of the pan 10 in a direction (see arrow B) towards the handle 16 so that base 12 is in an appropriate position to receive the flipped food.

It will be appreciated by those skilled in the art that, where the food F is comminuted or particulate in nature, the same flipping action will result in a mixing of the food. Accordingly, the lip 20 may be of utility for comminuted or particulate food where mixing rather than inversion of the food is the primary goal. However, as a general matter, a certain degree of flipping is desirable even when the food is simply being mixed in order to ensure cooking of all exposed food surfaces.

While the flipping action described above is used by various professional cooks and chefs, those skilled in the culinary arts will appreciate that various other flipping actions are used by other professional cooks and chefs. For example, some utilize a generally vertical movement of the pan with little, if any, horizontal motion thereof. In some instances the vertical motion is initially upwardly, while in other instances the vertical motion is initially downwardly. The design of the lip 20, as illustrated, is intended to provide the requisite flipping action for any of the diverse motions used by the aforesaid professional cooks and chefs. Nonetheless, it is within the contemplation of the present invention that a variety of pans be provided, each with a lip intended to best facilitate particular flipping motions so that a purchaser may select the pan best adapted for the purchaser's particular flipping movement.

Preferably the lip 20 extends above the rim 14 about 0.5 to 2.0 inches, optimally about 1.0 inch, and defines a vertical radius of curvature of 0.5 to 2.0 inches, optimally 1.0 inch. The horizontal cross section of the lip 20 preferably follows the horizontal cross section of the top of the rim segment 22. As appreciated by those skilled in the art, however, the optimal height and radius of curvature for the lip 20 may vary for particular foods depending upon a variety of factors including the size, density, viscosity, cohesiveness, and the like of the food in the pan 10.

Referring now to FIGS. 3 through 6 in particular, therein illustrated is a flip and drain pan, generally designated 50, according to a second embodiment of the present invention. Except as noted herein below, the flip and drain pan 50 is similar to the flip pan 10. Primarily, the difference resides in the imperforate lip 20 of pan 10 being replaced by a perforate lip, generally designated 52, which defines drainage perforations 54 configured and dimensioned to permit the passage therethrough of liquid L from the pan 50 while precluding the passage therethrough of all or essentially all of the solid food F from the pan 50.

The pan 50 additionally comprises a blocking member, generally designated 60, which defines drainage perforations 64, similar to the drainage perforations 54 of perforate lip 52. Thus the drainage perforations 54, 64 of the perforate lip 52 and blocking means 60, respectively, are each configured and dimensioned to block passage of all or essentially all of the solid food particles F therethrough, while allowing passage therethrough of liquid L, as illustrated in FIG. 6.

The blocking member 60 is movable relative to the perforate lip 52 between a draining position and a blocking position. Means 66, such as a "stay-cool" knob, is secured to blocking member 60 in order to effect such movement thereof relative to perforate lip 52 by slidably moving the blocking member 60 relative to the perforate lip 52. Preferably the inner surface of the blocking member 60 is slidingly moved over an outer surface of the perforate lip 52, as illustrated, but in an alternative design the blocking member 60 may be disposed inwardly of the perforate lip 52 so that the outer surface of the blocking member 60 is slidingly moved over the inner surface of the perforate lip 52.

Preferably the moving means 66 slidably moves the blocking member 60 horizontally relative to the perforate lip 52, but in an alternative design the blocking member 60 may slidably move the blocking member 60 vertically relative to perforate lip 52, with the same desired result.

In the draining position illustrated in FIG. 6, the blocking member perforations 64 are aligned with the lip perforations 54, thereby to enable a passage of liquid L outwardly from the pan successively through both of the lip perforations 54 and blocking member perforations 64 (as illustrated, first through the lip perforations 54 and then through the blocking member perforations 64). In the blocking position illustrated in FIGS. 3–5, the blocking member perforations 64 are non-aligned with the lip perforations 54, thereby to block the passage of liquid outwardly beyond the perforations (as illustrated, beyond the lip perforations 54).

The blocking member 60 is secured to the perforate lip 52 by one or more inwardly projecting pins 68 (three being illustrated), each of which passes through a respective slot 70 (three being shown) in perforate lip 52. Preferably the slots 70 are horizontally oriented and of a length which permits horizontal movement of the blocking member perforations 64 (relative to lip perforations 54) between an aligned position and a non-aligned position. To maintain the pins 68 within the slots 70, the pins 68 preferably have enlarged free ends (which may simply be formed by peening the free ends of the pins after passage thereof through the lip perforation 54).

Preferably, friction means or releasable locking means (not shown) may be provided for maintaining the blocking member 60 both in the draining position and in the blocking position against accidental movement of the blocking member 60 to or toward the other position.

The horizontal spacing between drainage perforations 54 and the horizontal spacing between drainage perforations 64 are preferably equal to each other, and both are preferably equal to the diameter of a drainage perforation 54, 64, typically about ⅜ of an inch. The horizontal length of each slot 70 is preferably equal to the sum of the diameter of the pin 68 therethrough and the diameter of the drainage perforations 54, 64. When the blocking member 60 is movable vertically rather than horizontally, the referenced spacings and lengths are vertical rather than horizontal. Of course, it is not necessary that the diameters of the drainage perforations 54 be the same as the diameters of the drainage perforations 64 as either may be relied on to block the passage of food particles out of the pan (the inner lip perforations 54 preferably being smaller in this instance than the outer blocking member perforations 64).

In order to effect draining of liquid from the pan 50, the knob 66 is first appropriately positioned to move the blocking member 60 until the pins 68 contact the appropriate extreme ends of slots 70, thereby to align the drainage perforations 54, 64. Then, as illustrated in FIG. 6, the pan is tilted downwardly (for example, over a sink or liquid receptacle) so that the liquid L within the pan 50 flows over the top of the rim segment 22, against perforate lip 52, and downwardly through the aligned drainage perforations 54, 64 out from the pan 50. Solid food particles F are, of course, stopped by the drainage perforations 54 or 54, 64 and thus retained within the pan 50. Appropriate care should be taken during the draining operation to ensure that either the liquid does not flow over the lip 52 or, at least, that the solid food particles are not carried out of the pan 50 by any liquid L flowing over the top of perforate lip 52. This is easily accomplished by appropriately adjusting the downward tilt of the pan 50.

Once drainage has been completed, the knob 66 may be used to move the blocking member 60 back to the blocking position (with the pins 68 at the other extreme ends of slots 70). Alternatively, biasing means (not shown) may be provided to return the blocking member 60 to the blocking position upon completion of the drainage process and subsequent release of a locking means.

When the blocking member 60 is in the blocking position, the perforate lip 52 acts much as the imperforate lip 20 of the first embodiment 10 for flipping purposes.

Referring now to FIGS. 3–6, in a preferred embodiment of the pan 50 affording a more rapid and complete draining of liquid from the pan 50, an upper portion 22a of the rim segment 22 defines additional drainage perforations 54 and a lower portion 60a of the blocking member 60 (extending downwardly over the upper portion 22a of the rim segment 22) defines additional drainage perforations 64. The lower portion 60a of blocking member 60 is movable with the remainder of the blocking member 60 between an auxiliary draining position and an auxiliary blocking position. In the auxiliary draining position the upper portion additional perforations 54 and the lower portion additional perforations 64 are in alignment, and in the auxiliary blocking position the upper portion additional perforations 54 and the lower portion additional perforation 64 are not in alignment. Thus, when the blocking member 60 is moved to the draining position relative to perforate lip 52, the lower portion 60a thereof assumes the auxiliary draining position relative to the rim segment upper portion 22a. As this results in more drainage perforations 54, 64 being in alignment, drainage is faster and more complete. Alternatively, a lesser tilt angle of pan 50 may be employed to initiate safer drainage through the additional drainage perforations 54, 64.

To summarize, the present invention provides a pan having a configuration which facilitates the flipping of food—whether it be full inversion, half inversion or mixing—without the use of a spatula or fork and optionally facilitates draining of liquid therefrom, while retaining solid food particles therein, without the use of an auxiliary culinary utensil. The pan is simple and economical to manufacture, use and maintain.

Now that the preferred embodiments of the present invention have been showed and described in detail, various modifications and improvements thereon will become readily apparent to those skilled in the art. Accordingly, the spirit and scope of the present invention is to be construed broadly and limited only by the appended claims, and not by the foregoing specification.

I claim:

1. A flip and drain pan comprising:
  (A) a substantially flat and generally circular base;
  (B) a peripheral rim upstanding from said base;
  (C) a handle protecting outwardly from said rim; and
  (D) a lip upstanding from a limited segment of a top of said rim generally opposite said handle, said lip defining drainage perforations, said lip having an arcuate cross section extending upwardly and inwardly from the segment of the top of said rim, whereby foodstuffs within the pan may be flipped against said lip by appropriate movement of said handle;
  (E) a member movable relative to said lip and defining drainage perforations, and
  (F) means for moving said member relative to said lip between
    (i) a draining position wherein said member perforations are aligned with said lip perforations, thereby to enable the passage of liquid outwardly successively through said lip perforations and said member perforations, and (ii) a blocking position wherein said member perforations are non-aligned with said lip perforations, thereby to block the passage of liquid outwardly beyond said lip perforations.

2. The pan of claim 1 wherein moving means slidably moves an inner surface of said member over an outer surface of said lip.

3. The pan of claim 1 wherein moving means slidably moves said member horizontally relative to said lip.

4. The pan of claim 1 wherein member is releasably lockable in each of said blocking and draining positions.

5. The pan of claim 1 wherein said drainage perforations are configured and dimensioned to substantially block passage of solid foodstuff particles therethrough.

6. The pan of claim 1 wherein an upper portion of said rim segment defines drainage perforations, and a lower portion of said member extends over said upper portion of said rim segment, defines drainage perforations, and is movable with the remainder of said member between
   (i) an auxiliary draining position wherein said upper portion perforations and said lower portion perforations are in alignment, and
   (ii) an auxiliary blocking position wherein said upper portion perforations and said lower portion perforations are not in alignment.

7. A flip and drain pan comprising:
(A) a substantially flat and generally circular base;
(B) a peripheral rim upstanding from said base;
(C) a handle projecting outwardly from said rim; and
(D) a lip upstanding from a limited segment of a top of said rim generally opposite said handle, said lip having an arcuate cross section extending upwardly and inwardly from the segment of the top of said rim, whereby foodstuffs within the pan may be flipped against said lip by appropriate movement of said handle, said lip defining drainage perforations and having a vertical radius of curvature less than that of said rim;
(E) a member movable relative to said lip and defining drainage perforations, and
(F) means for moving said member relative to said lip between
   (i) a draining position wherein said member perforations are aligned with said lip perforations, thereby to enable the passage of liquid outwardly successively through said lip perforations and said member perforations, and
   (ii) a blocking position wherein said member perforations are non-aligned with said lip perforations, thereby to block the passage of liquid outwardly from the pan beyond said lip perforations;
      at least some of said drainage perforations being configured and dimensioned to substantially block passage of solid food particles therethrough.

8. The pan of claim 7 wherein moving means slidably moves an inner surface of said member horizontally over an outer surface of said lip.

9. The pan of claim 7 wherein an upper portion of said rim segment defines additional drainage perforations, and a lower portion of said member extends downwardly over said upper portion of said rim segment, defines additional drainage perforations, and is movable with the remainder of said member between
   (i) an auxiliary draining position wherein said upper portion additional perforations and said lower portion additional perforations are in alignment, and
   (ii) an auxiliary blocking position wherein said upper portion additional perforations and said lower portion additional perforations are not in alignment.

* * * * *